(12) United States Patent
Yamashita (10) Patent No.: US 6,212,134 B1
(45) Date of Patent: Apr. 3, 2001

(54) WATCH DOG TIMER SYSTEM (75) Inventor: Atsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/468,318

(22) Filed: Dec. 21, 1999

(30) Foreign Application Priority Data

Dec. 22, 1998 (JP) .................................................. 10-365044

(51) Int. Cl.[7] .................................................. G04B 47/00
(52) U.S. Cl. .......................... 368/10; 368/107; 368/395; 368/651; 368/652; 368/713; 368/1
(58) Field of Search ........................... 368/101, 107–113; 395/550, 651, 652; 701/31; 702/183; 713/1

(56) References Cited

U.S. PATENT DOCUMENTS 4,597,052 * 6/1986 Majsuda ................................. 364/550
5,860,002 * 1/1999 Huang .................................... 395/652
6,009,521 * 12/1999 Huang ........................................ 713/1

FOREIGN PATENT DOCUMENTS 4-241642    8/1992    (JP) .

* cited by examiner

Primary Examiner—Vit Miska
(74) Attorney, Agent, or Firm—McGuireWoods LLP

(57) ABSTRACT

A watch dog timer system which has an abnormality checking function of a high degree of reliability. In the watch dog timer system, abnormality of a computer system is detected as a variation of a value allocated in accordance with an execution condition of a program. To this end, a register receives execution state data defined in accordance with an execution condition of the program from a processor or CPU of the computer system and stores the execution state data before a counter of the watch dog timer system overflows. A comparator compares the execution condition data stored in the register and state sequence data indicative of a state sequence of the program stored in a ROM in advance with each other and generates a reset signal for resetting the computer system when the comparison reveals incoincidence.

4 Claims, 8 Drawing Sheets

WATCH DOG TIMER SYSTEM

BACKGROUND OF THE INVENTION

1. Field of the Invention

The present invention relates to a watch dog timer system which is usually employed as a fault supervisory function for software/hardware in an industrial computer or a fault-tolerant computer.

2. Description of the Related Art

A watch dog timer function is used to detect a stop of a computer arising from a bug of a program or from any other cause particularly where the computer is of the type which must not stop such as an industrial computer or a controller for controlling a machine or a product.

The watch dog timer function is usually useful and is sometimes incorporated in an LSI of a one-chip CPU in recent years. This is because it is a definition of normal operation of a computer that "a computer clears a watch dog timer in a fixed time=a program is operating normally". However, if execution of a program enters a permanent loop which includes clearing of a watch dog timer because of a bug, then because this does not satisfy the definition, the bug cannot be detected.

Further, it is sometimes the case that, when an abnormal value is used as a value to be calculated because of some hardware fault, a system operates in a different manner since the value can possibly be assumed by the system. Thus, it is demanded to detect such abnormal operations of a computer as described above with a high degree of accuracy.

A countermeasure which satisfies the demand is disclosed, for example, in Japanese Patent Laid-Open No. Hei 4-241642 wherein it is defined that a system is operating normally when "check points are cleared" using a pass state indication register and "a watch dog timer is cleared" to detect abnormal operation of the system.

According to the system described above,
1. an "execution condition of a program" is not defined precisely,
2. an order in time in which check points are to be passed is not detected, and
3. production of a program is complicated because a plurality of commands including a pass state indication register setting command and a watch dog timer clearing command are used.

Therefore, the system of the document mentioned above is disadvantageous in that it cannot detect a permanent loop which includes the pass state indication register setting command by which check points are set and the watch dog timer clearing command. The system is disadvantageous also in that, upon production of a program, it is not easy for a programmer to use the system in that it is not clear what time difference should be provided to the pass state indication register setting command for check points from the watch dog timer clearing command and that the program must be produced using a conditional branch and so forth so that a program route for execution of the pass state indication register setting command and another program route which includes the watch dog timer clearing command may coincide with each other.

Also, since a check is performed at each check point, the system is disadvantageous in that it does not allow, comparison between a plurality of computers as in designing of a fault-tolerant computer system (because setting of values of check points and confirmation of the same are isolated from each other).

SUMMARY OF THE INVENTION

It is an object of the present invention to provide a watch dog timer system which has an abnormality checking function of a high degree of reliability.

In order to attain the object described above, according to the present invention, abnormality of a system is detected as a variation of a value allocated in accordance with an execution condition of a program.

More particularly, there is provided a watch dog timer system including a counter for resetting an entire computer when a value of the counter overflows, comprising execution condition storage means for receiving execution state data defined in accordance with an execution condition of a program from a processor of the computer and storing the execution state data before the counter overflows, and comparison means for comparing the execution condition data stored in the execution condition storage means and state sequence data indicative of a state sequence of the program and generating a reset signal for resetting the entire computer when the comparison reveals incoincidence.

Where the state sequence of the program is determined in advance, the watch dog timer system may further comprise state sequence storage means for storing the state sequence data indicative of the state sequence of the program in advance, and readout means for successively reading out the state sequence data stored in the state sequence storage means.

With the watch dog timer system, the following advantages can be achieved.

If execution of the program enters a permanent loop or the like and the computer stops for a fixed time, then the entire computer is reset and re-starts its normal operation. Consequently, a non-deactivating computer or a fault-tolerant computer system can be constructed using the watch dog timer system.

Further, since a value is allocated to each execution condition of the program and, when the counter of the watch dog timer is cleared, the value of the watch dog timer is compared to detect whether or not the computer is in a state transition condition determined in advance, not only it can be detected whether or not the computer is in a stopping state, but also it can be detected that the computer is entrapped in an abnormal flow of program operation.

Where a plurality of non-deactivating computers or fault-tolerant computers are involved and the same program is used between them, since operation conditions of them with respect to time are similar to each other, an abnormal operation of any of the computers is detected by comparison only of the value of an operation condition of the program.

Upon debugging of the program, the watch dog timer system can be used also to confirm/detect that a program execution condition estimated in advance is entered.

In order to cope with a flexible state transition condition of the program, the watch dog timer system may further comprise a state machine for producing state sequence data corresponding to a state transition condition of the program from the execution state data stored in the execution condition storage means.

In order to detect a fault between a plurality of computers including the computer, the watch dog timer system may further comprise selection means for selectively inputting time sequence data transmitted thereto from another computer to the comparison means. This allows detection of which one of a plurality of non-deactivating computers is entrapped in an abnormal state.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
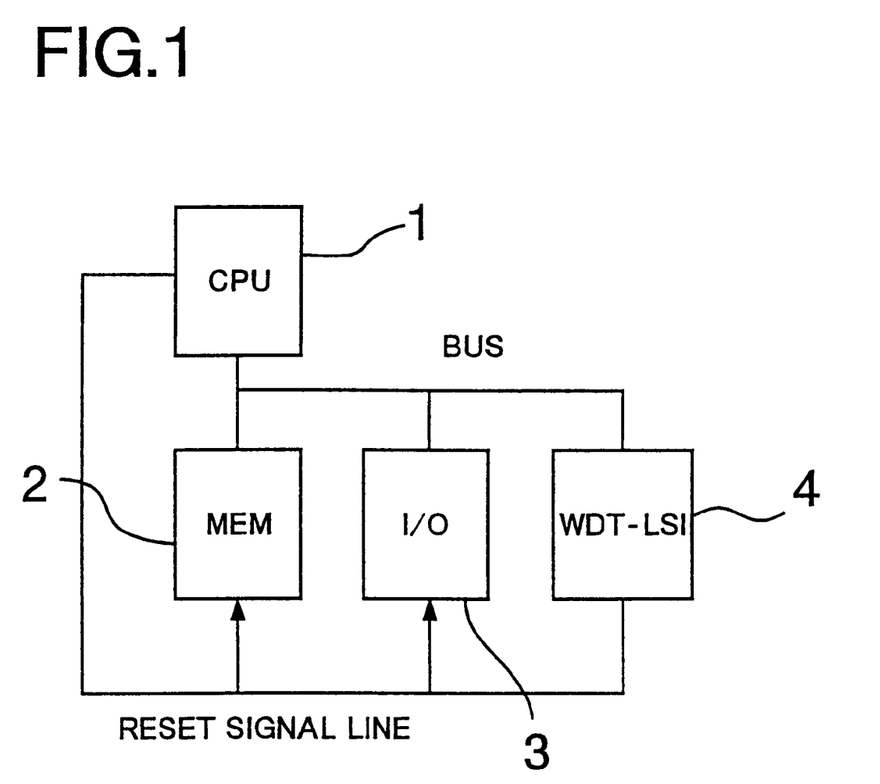
FIG. 1 is a block diagram showing a basic construction of a computer system in which a watch dog timer system according to the present invention is incorporated.

Referring first to FIG. 1, there is shown a computer system in which a watch dog timer system according to the present invention is incorporated. The computer system shown has a common computer configuration including a microprocessor (hereinafter referred to as CPU (central processing unit)) 1, a memory (MEM) 2, an external inputting/outputting unit (hereinafter referred to as I/O unit; I/O) 3 and a bus system BUS which interconnects the components. The computer system further includes an LSI (large scale integration; WDT-LSI) 4 which has a watch dog timer function.

The CPU 1 extracts a program from the memory 2 and interprets and executes the program. In accordance with commands of the program, the CPU 1 extracts, processes and/or outputs data from or to the memory 2 and/or the I/O unit 3. For different execution conditions of the program (for example, initialization processing, inputting processing, operation processing, outputting processing and so forth), different values determined uniquely are defined.

The watch dog timer LSI 4 includes a counter 7 called watch dog timer counter as hereinafter described in detail with reference to FIG. 2 and has a function of resetting the entire computer when the count value of the watch dog timer counter 7 overflows. In other words, in the computer system, the watch dog timer counter 7 must be cleared after each fixed time, and when such clearing of the watch dog timer counter 7 is not performed, the computer system is re-started because it is determined that the computer is operating abnormally.

To this end, in accordance with execution of the program, the CPU 1 notifies the watch dog timer LSI 4 of an execution condition of the program at such time intervals that the watch dog timer counter 7 does not overflow.

Further, in the computer system, the watch dog timer counter 7 is cleared only if the CPU 1 writes a unique value as a sequence set in advance in accordance with a time series into the watch dog timer LSI 4.

Accordingly, the CPU 1 determines a value to be written into the watch dog timer LSI 4 in accordance with an execution condition of the program and writes the value into the watch dog timer LSI 4 before the watch dog timer counter 7 overflows thereby to declare normal operation of the system. Further, abnormality of the computer system which cannot be detected using the prior art can be detected when the value to be written into the watch dog timer LSI 4 is different from the sequence determined in advance.

Consequently, the computer system is advantageous, for example, in that 1. a runaway that "a program executes a permanent loop in a loop which includes an access to a watch dog timer LSI", which cannot be detected by a conventional watch dog timer function, can be detected;
2. it can be detected that an operation different from a sequence determined in advance is performed (an analysis of a cause can be performed); and
3. since a value is determined from an execution condition of a program, a state of the entire computer system which cannot be grasped with the prior art can be grasped. Consequently, detection of coincidence in state between computers which form a fault-tolerant computer system is allowed.

Figure 2:
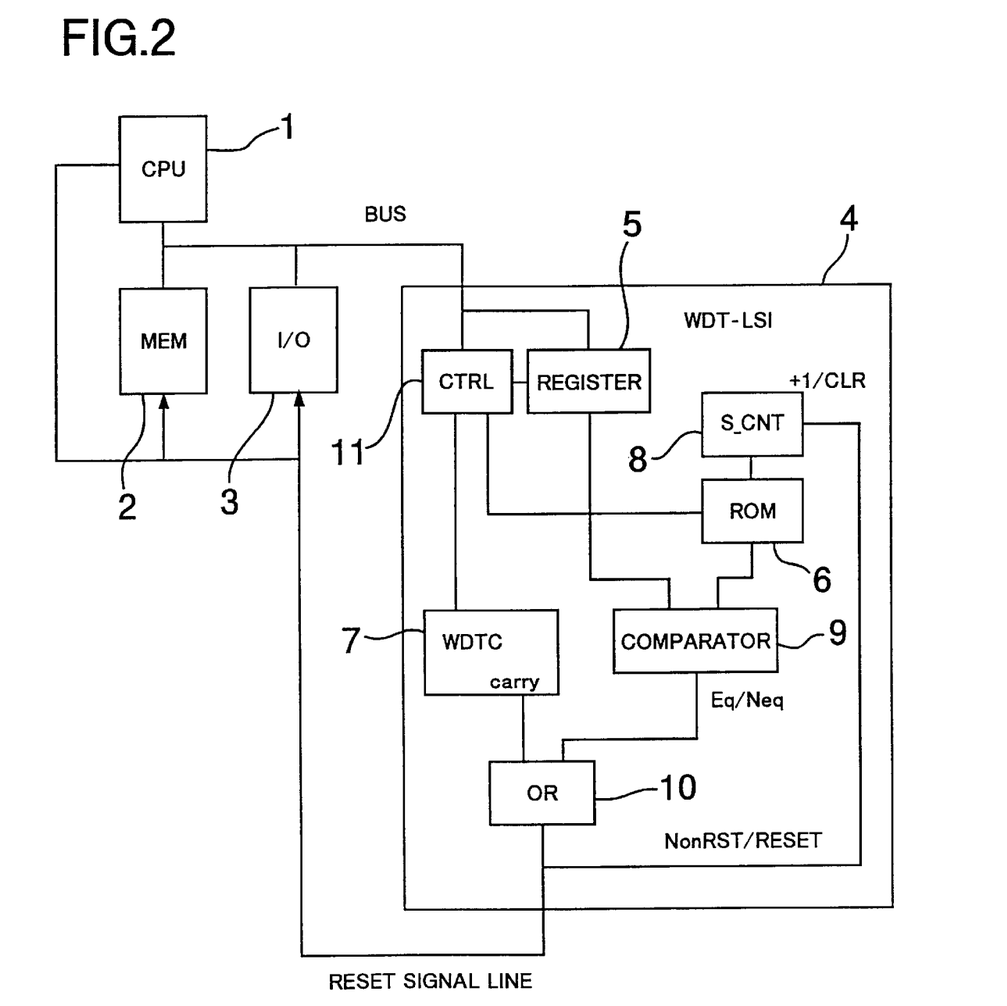
FIG. 2 is a block diagram showing a watch dog timer system to which the present invention is applied.

Referring now to FIG. 2, there is shown in detail an internal construction of the watch dog timer LSI 4. The watch dog timer LSI 4 includes a register 5 for storing a write value from the CPU 1, that is, a value determined uniquely for an execution condition of the program, a ROM (read only memory) 6 in which a state sequence determined in advance is stored, a watch dog timer counter (WDTC) 7, a state counter (S_CNT) 8 for the ROM 6 for state sequence storage, a comparator 9 for comparing data of the ROM 6 for state sequence storage and execution state data of the register 5 with each other, a OR circuit (OR) 10 for outputting a reset signal, and a controller (CTRL) 11 for controlling the entire watch dog timer LSI 4.

After execution state data from the CPU 1 is stored into the register 5, the watch dog timer LSI 4 executes reading from an address of the ROM 6 for state sequence storage designated by the state counter 8 and compares state sequence data read out from the ROM 6 for state sequence storage with the stored contents of the register 5, which are the execution state data from the CPU 1, by means of the comparator 9, and then increments the state counter 8 by one. If the state counter 8 thereupon exceeds an upper limit value to the address, then it is initialized to a prescribed address value (which may be set arbitrarily). If the comparison reveals that the compared data are different from each other, then the watch dog timer LSI 4 resets all of the other components of the computer system so that the computer system may re-execute operation from its initial state.

Consequently, if an event different from the status transition sequence determined in advance occurs, then the watch dog timer LSI 4 can determine that the system is operating abnormally.

The watch dog timer LSI 4 outputs a RESET signal to reset the entire computer system when the watch dog timer counter 7 therein overflows. However, if the controller 11 detects writing from the CPU 1 and execution state data from the CPU 1 is stored into the register 5, then the controller 11 resets the watch dog timer counter 7, and consequently, forwarding of the RESET signal is postponed. Simultaneously with the storage of the execution state data into the register 5, the controller 11 inputs a value as an address of the ROM 6 to the state counter 8 to effect a read access to the ROM 6, and the comparator 9 compares state sequence data thus read out from the ROM 6 with the execution state data of the register 5. If the comparison reveals coincidence between them, then the state counter 8 is incremented, but if the comparison reveals incoincidence between them, then a RESET signal is outputted to reset the entire computer system.

The CPU 1, memory 2 and I/O unit 3 shown in FIGS. 1 and 2 are well known to those skilled in the art and do not relate directly to the present invention, and therefore, description of a detailed construction of them is omitted herein.

Operation of the computer system is described below.

Figure 3:
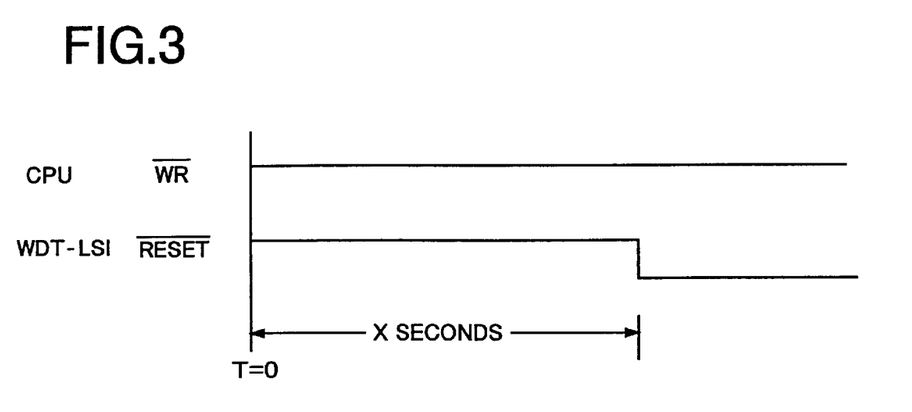
FIG. 3 is a timing chart illustrating principal operations of a watch dog timer LSI shown in FIG. 2.

First, operation of the watch dog timer LSI 4 is described with reference to a timing chart of FIG. 3. Usually when clearing of or writing into the watch dog timer LSI 4 is not performed, the watch dog timer LSI 4 performs a watch dog timer operation of incrementing the watch dog timer counter 7, which is an internal counter thereof, with a clock signal supplied thereto from the outside. Consequently, if writing into the watch dog timer LSI 4 does not occur for fixed x seconds (the x seconds are designed for each system as a value unique to the system), that is, if a WR signal is not received from the CPU 1 for x seconds, then the watch dog timer counter 7 overflows and a RESET signal is forwarded from the watch dog timer LSI 4.

Figure 4:
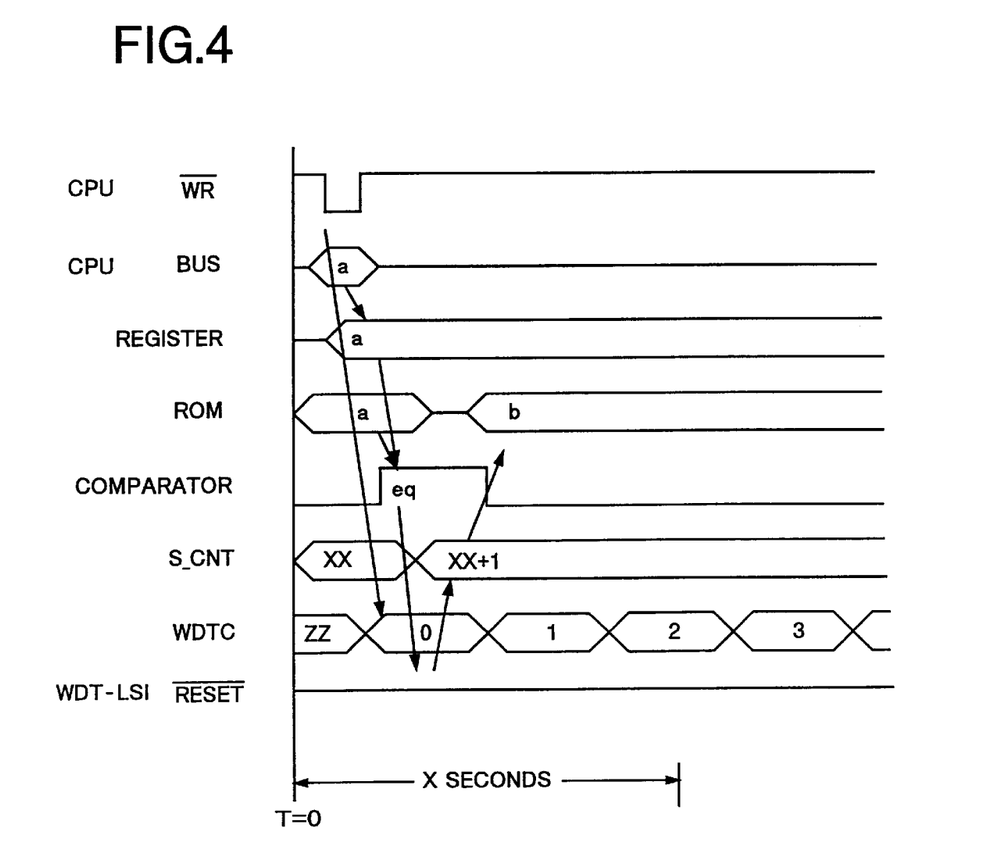
FIG. 4 is a timing chart illustrating detailed operation of the watch dog timer system of FIG. 2.
Figure 5:
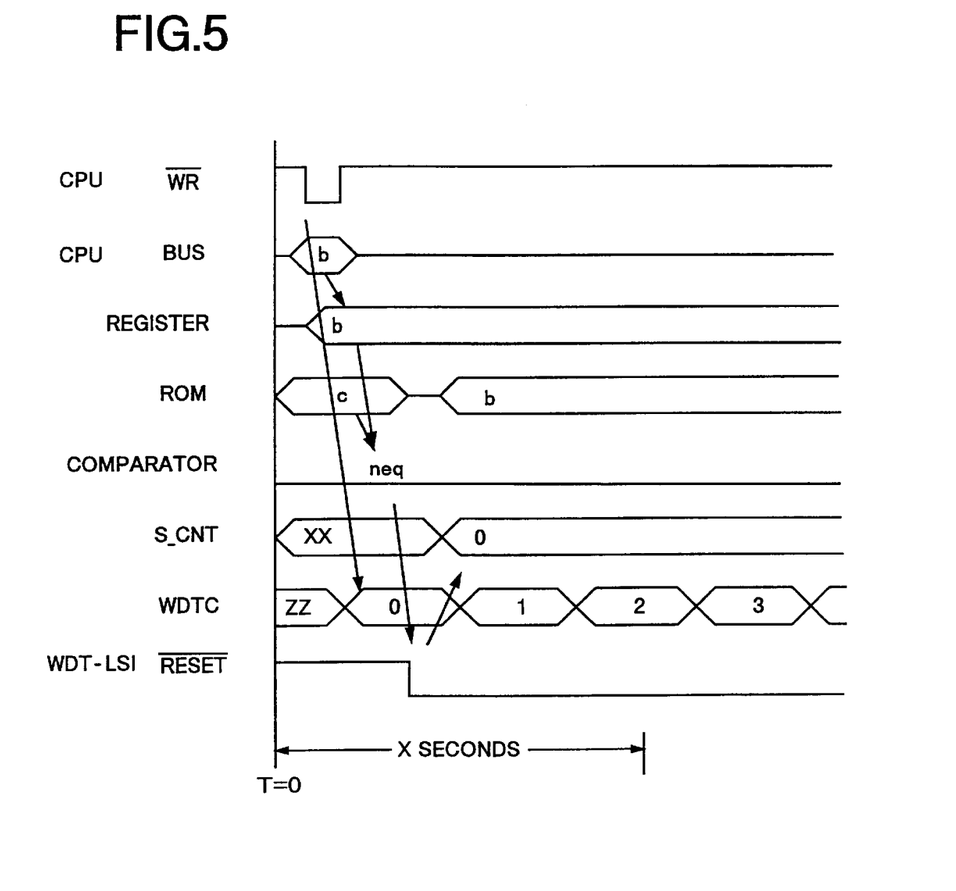
FIG. 5 is a similar view but illustrating different operation of the watch dog timer system of FIG. 2.

On the other hand, a writing operation of an execution state into the watch dog timer LSI 4 (a clearing operation of the watch dog timer counter 7) is executed in accordance with timing charts of FIGS. 4 and 5. In particular, a writing operation of a program execution condition from the CPU 1 is reported to the watch dog timer LSI 4 with a CPU-WR signal and a BUS signal. Upon reception of the signals, the controller 11 of FIG. 2 loads the value on the bus system BUS into the register 5 and simultaneously clears the watch dog timer counter 7. Thereafter, the comparator 9 compares state sequence data from the ROM 6 (representing an execution condition of the program scheduled) and the data of the register 5 with each other to detect whether or not they are equal each other. If the result of the comparison reveals incoincidence, then the watch dog timer LSI 4 issues a reset signal for the computer system and clears the state counter 8 to zero. On the other hand, if the result of the comparison reveals coincidence, then no reset signal is outputted, and the state counter 8 is incremented.

Since the watch dog timer LSI 4 has such a watch dog timer function as just described, if the execution of the program by the CPU 1 enters a permanent loop or the like and the system stops for a fixed time, then the entire system is reset and thus re-starts its normal operation. Accordingly, a non-deactivating computer or a fault-tolerant computer system can be constructed.

Further, since the watch dog timer LSI 4 is constructed such that a value is allocated to each execution condition of the program and, when the watch dog timer is cleared, the value of the watch dog timer is compared to detect whether or not the system is in a state transition condition determined in advance, not only it can be detected whether or not the system is in a stopping state, but also it can be detected that the system is entrapped in an abnormal flow of program operation.

Accordingly, the watch dog timer LSI 4 is further advantageous in that, where a plurality of non-deactivating computers or fault-tolerant computers are involved and the same program is used between them, since operation conditions of them with respect to time are similar to each other, an abnormal operation of the computer system (the abnormal operation in this instance is a difference of the program which may cause occurrence of a hardware fault or the like) is detected by comparison only of the value of an operation condition of the program. Further, upon debugging of a program, the watch dog timer LSI 4 can be used also to confirm/detect that a program execution condition estimated in advance is entered.

It is to be noted that, while, in the computer system described above, the watch dog timer LSI 4 only outputs a reset signal to the entire computer system, where it is used as such a debugging function as described above, a signal may be outputted otherwise as an interrupt signal to the CPU 1 or the like.

Further, since the ROM 6 for state sequence storage can perform only predetermined operations as variations of the execution condition of the program, the execution condition of the program can be grasped but only roughly. Therefore, another construction may be adopted wherein a state machine is formed and comparison with a state produced by the state machine is performed.

Figure 6:
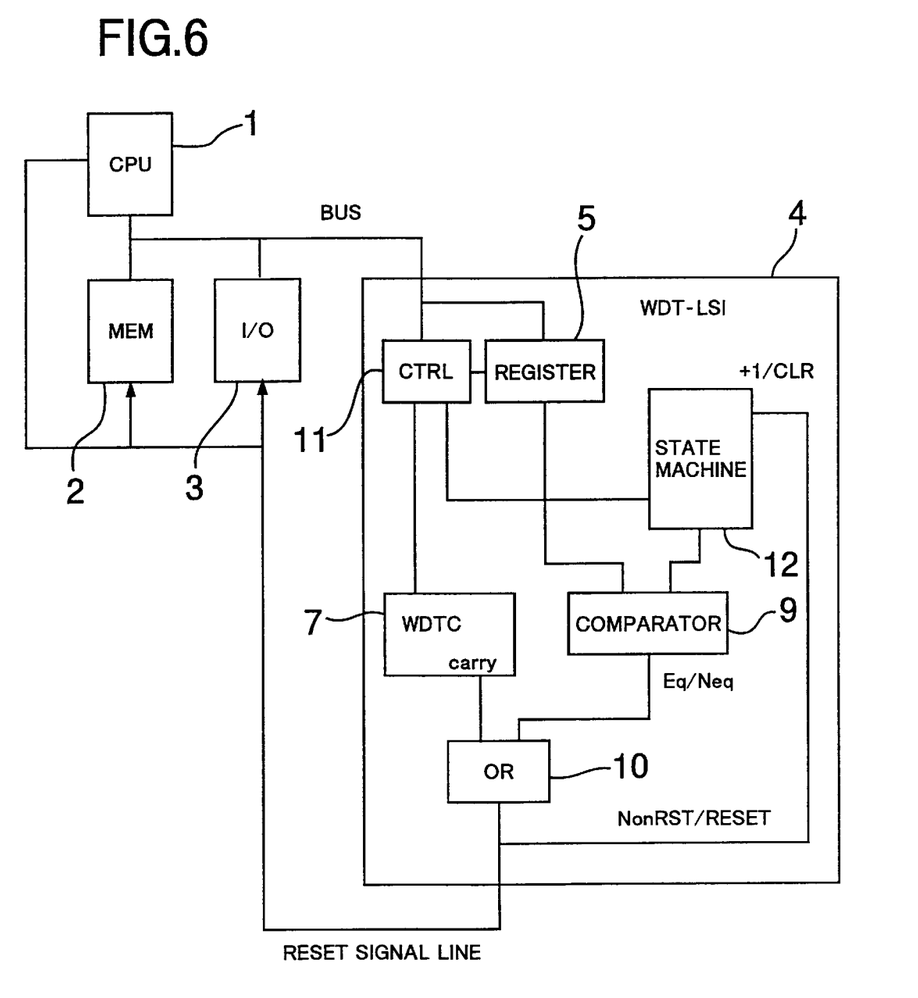
FIG. 6 a block diagram showing a modification to the watch dog timer system of FIG. 2.

Such a construction as just described is shown in FIG. 6. Referring to FIG. 6, the computer system shown is a modification to but is different from the computer system described hereinabove with reference to FIG. 1 in construction of the watch dog timer LSI 4. In particular, the watch dog timer LSI 4 shown in FIG. 6 includes, in place of the ROM 6 for state sequence storage of FIG. 2, a state machine 12 to which states of the register for state storage and an internal flip-flop are inputted. In particular, the watch dog timer LSI 4 which includes the ROM 6 for state sequence storage shown in FIG. 2 has a problem in that the execution condition of the program is ready only for the transition condition which is included in repetitions of contents of the ROM 6. However, where the state machine 12 is employed, state sequence data corresponding to an arbitrary state transition condition of the program can be produced at any suitable time from the execution state data stored in the register 5.

In this manner, the watch dog timer LSI 4 shown in FIG. 6 is advantageous in that it can cope flexibly with a state transition condition of a program.

In the watch dog timer LSI 4 shown in FIG. 6, the state machine 12 may be another CPU and another program or another sequencer. Also it is possible to replace the internal ROM 6 of the watch dog timer LSI 4 by a RAM while a program execution condition is dynamically varied using another CPU/sequencer.

In the watch dog timer LSI 4 shown in FIGS. 2 or 6, the configuration that a watch dog timer function including a condition of a program is incorporated in a single non-deactivating computer is obtained using the watch dog timer LSI 4. However, since the execution condition of a program is defined, where a plurality of non-deactivating computers are involved, it is possible to detect which one of the non-deactivating computers is in an abnormal state.

On the other hand, detection of a fault between a plurality of non-deactivating computers or fault-tolerant computers can be achieved by eliminating the ROM 6 of the watch dog timer LSI 4 and using an input from the program execution state storage register of another watch dog timer LSI.

Figure 7:
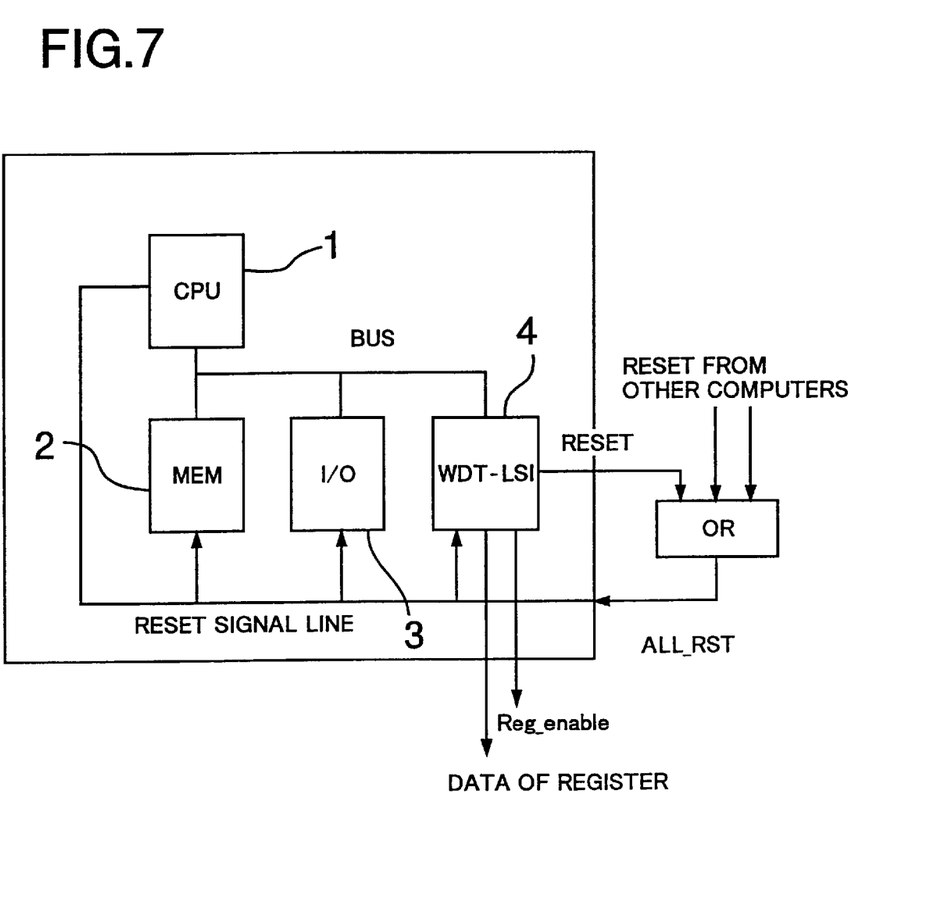
FIG. 7 is a block diagram showing a computer of another computer system in which another watch dog timer system to which the present invention is applied is incorporated.
Figure 8:
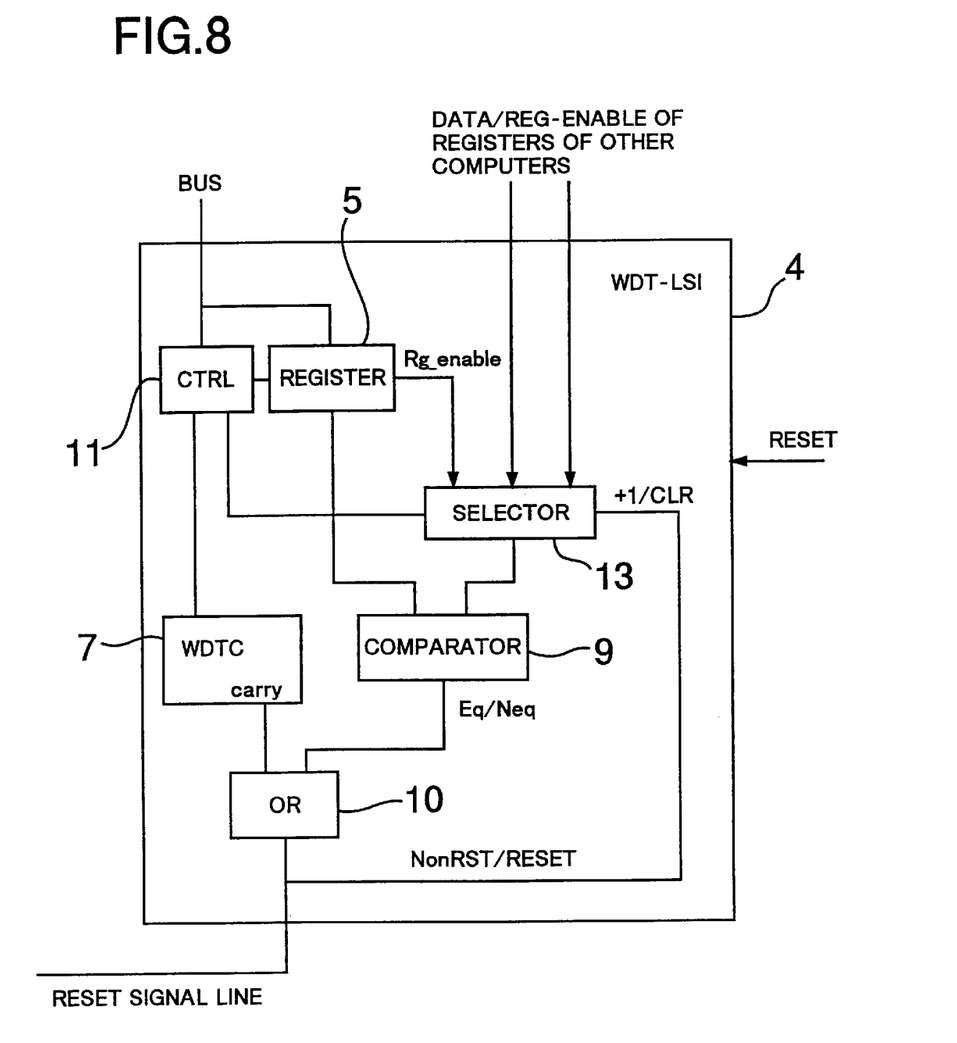
FIG. 8 is a block diagram showing a detailed construction of a watch dog timer LSI shown in FIG. 7.

A fault-tolerant computer system having such a construction as just described is shown in FIGS. 7 and 8. Referring to FIGS. 7 and 8, the fault-tolerant computer system shown includes n (n is a natural plural number) non-deactivating computers although only one is shown in FIGS. 7 and 8, and a fault detection control for the non-deactivating computers is formed from a watch dog timer LSI 4 of the computer shown in FIGS. 7 and 8. In the computer system, although it is possible to store different execution conditions of a program in such a form as the ROM 6 in the watch dog timer LSI 4 described hereinabove, it is otherwise possible to adopt another more flexible construction wherein values of execution conditions of the program written in the watch dog timer LSI 4 from the other non-deactivating computers and the self non-deactivating computer are compared with each other to detect a faulty computer by decision by majority.

In this instance, as seen in FIG. 8, a reg-enable signal whose level changes to the high level when a value is written into the register 5 for state storage of the watch dog timer LSI 4 from the CPU 1 is inputted to a selector 13. Then, the comparison of the values is not performed at such a point of time at which writing into the register 5 as described hereinabove in connection with the computer systems of FIGS. 1 and 6 is performed, but at a point of time when the levels of all of the n reg-enable signals to the watch dog timer LSI 4 change to the H level, the execution condition of the program exhibited by a majority of the non-deactivating computers is used as a normal value to effect comparison by means of the comparator 9. Thereupon, if writing is performed while the reg-enable signal is in the H level already, then although the watch dog timer counter 7 is cleared, the value is not loaded into the register 5 whereas the CPU and so forth are halted thereby to additionally provide a synchronization function.

Accordingly, the fault-tolerant computer system including n non-deactivating computers can be provided with a watch dog timer function and a function for checking an execution condition of a program.

Besides, since the fault-tolerant computer system does not require determination of a time series of execution conditions of a program in advance, such synergetic and unique effects that an exchange of a ROM is not required also where a program which is modified frequently is used and that a higher capability for detection of an abnormal operation is achieved because determination of a value by decision by majority is adopted can be achieved.

While preferred embodiments of the present invention have been described using specific terms, such description is for illustrative purposes only, and it is to be understood that changes and variations may be made without departing from the spirit or scope of the following claims.

What is claimed is:

1. A watch dog timer system including a counter for resetting an entire computer when a value of said counter overflows, comprising:

execution condition storage means for receiving execution state data defined in accordance with an execution condition of a program from a processor of said computer and storing the execution state data before said counter overflows; and comparison means for comparing the execution condition data stored in said execution condition storage means and state sequence data indicative of a state sequence of the program and generating a reset signal for resetting the entire computer when the comparison reveals incoincidence.

2. A watch dog timer system as claimed in claim 1, further comprising state sequence storage means for storing the state sequence data indicative of the state sequence of the program in advance, and readout means for successively reading out the state sequence data stored in said state sequence storage means.

3. A watch dog timer system as claimed in claim 1, further comprising a state machine for producing state sequence data corresponding to a state transition condition of the program from the execution state data stored in said execution condition storage means.

4. A watch dog timer system as claimed in claim 1, further comprising selection means for selectively inputting time sequence data transmitted thereto from another computer to said comparison means.

* * * * *